United States Patent
Rajan et al.

(10) Patent No.: US 9,933,181 B2
(45) Date of Patent: Apr. 3, 2018

(54) METHOD OF AND SYSTEM FOR MINIMIZATION OF CONDENSER-FAN CYCLING FOR LOW AMBIENT TEMPERATURE

(71) Applicant: Lennox Industries LLC, Richardson, TX (US)

(72) Inventors: Siddarth Rajan, Dallas, TX (US); John Tran, The Colony, TX (US); Rakesh Goel, Carrollton, TX (US); Clay Toombs, Carrollton, TX (US)

(73) Assignee: Lennox Industries LLC, Richardson, TX (US)

( * ) Notice: Subject to any disclaimer, the term of this patent is extended or adjusted under 35 U.S.C. 154(b) by 163 days.

(21) Appl. No.: 15/015,220

(22) Filed: Feb. 4, 2016

(65) Prior Publication Data

US 2017/0227246 A1 Aug. 10, 2017

(51) Int. Cl.
*F24F 11/00* (2018.01)
*F25B 49/02* (2006.01)
*F24F 1/38* (2011.01)

(52) U.S. Cl.
CPC .............. *F24F 11/008* (2013.01); *F24F 1/38* (2013.01); *F24F 11/001* (2013.01); *F25B 49/022* (2013.01); *F24F 2011/0013* (2013.01); *F24F 2011/0083* (2013.01); *F25B 2500/31* (2013.01); *F25B 2600/0253* (2013.01); *F25B 2600/111* (2013.01); *F25B 2700/195* (2013.01); *F25B 2700/2106* (2013.01)

(58) Field of Classification Search
CPC ............ F24F 11/008; F24F 2011/0083; F24F 2011/0013; F24F 2011/0043; F25B 49/02; F25B 49/027; F25B 2500/31; F25B 2600/0253; F25B 2600/111; F25B 2600/17; F25B 2700/195; F25B 2700/2106
See application file for complete search history.

(56) References Cited

U.S. PATENT DOCUMENTS 5,551,248 A * 9/1996 Derosier .............. F24F 11/0009
62/155
2010/0223941 A1* 9/2010 Shah ...................... F24F 11/006
62/229

* cited by examiner

*Primary Examiner* — Jonathan Bradford
(74) *Attorney, Agent, or Firm* — Winstead PC

(57) ABSTRACT

A method of controlling a heating, ventilation and air-conditioning (HVAC) system includes measuring an ambient temperature and determining whether the ambient temperature is below a threshold temperature value. Responsive to a determination that the ambient temperature is below the threshold temperature value, measuring a condenser-fan cycle time of the HVAC system and setting a speed of the compressor based on the measured condenser-fan cycle time.

22 Claims, 6 Drawing Sheets

METHOD OF AND SYSTEM FOR MINIMIZATION OF CONDENSER-FAN CYCLING FOR LOW AMBIENT TEMPERATURE

TECHNICAL FIELD

The present invention relates generally to heating, ventilating and air conditioning (HVAC) systems, and more particularly, but not by way of limitation, to reducing cycling of a condenser fan within the HVAC system operating in low ambient temperature conditions.

BACKGROUND

HVAC systems include multiple components to perform a desired function. HVAC systems typically include components, such as, for example, a compressor, a condenser coil, and a condenser fan. Depending upon various parameters such as, for example, set-point-temperature and humidity, the HVAC system cycles its components on and off to satisfy a requested cooling demand. For example, the HVAC system may be programmed to maintain a specific temperature. In order to maintain the specific temperature over a period of time, it may be necessary to cycle components, such as the compressor and the condenser fan, on and off multiple times. Repetitive cycling of the HVAC system components ultimately reduces service life, which may lead to premature failure of one or more components of the HVAC system.

SUMMARY

A method of controlling a heating, ventilation and air-conditioning (HVAC) system includes measuring an ambient temperature and determining whether the ambient temperature is below a threshold temperature value. If the ambient temperature is below the threshold temperature value, a condenser-fan cycle time of a compressor is measured. The compressor speed is then set based on the measured condenser-fan cycle time.

A heating, ventilation, and air-conditioning (HVAC) system includes a controller configured to receive an ambient temperature of an area surrounding an outdoor unit of the HVAC system, determine whether the ambient temperature is below a threshold temperature value, responsive to a determination that the ambient temperature is below the threshold temperature value, measure a condenser-fan cycle time of the HVAC system, and set a compressor speed based on the measured condenser-fan cycle time.

A method of controlling a heating, ventilation and air-conditioning (HVAC) system includes measuring an ambient temperature and determining whether the ambient temperature is below a threshold temperature value. Responsive to a determination that the ambient temperature is below the threshold temperature value, measuring a condenser-fan cycle time of a compressor. The method further includes determining if the condenser-fan cycle time is greater than a first threshold time. Responsive to a determination that the condenser-fan cycle time is greater than the first threshold time, setting the compressor to operate at a demand speed. Responsive to a determination that the condenser-fan cycle time is less than the first threshold time, determining if the condenser-fan cycle time is below a second threshold time. Responsive to a determination that the condenser-fan cycle time is below the second threshold time, setting the compressor to operate at the low operating speed for a desired runtime.

BRIEF DESCRIPTION OF THE DRAWINGS

Reference is now made to the following descriptions taken in conjunction with the accompanying drawings, in which.

DETAILED DESCRIPTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

To direct operations of components within an HVAC system, each HVAC system includes a controller. In addition to directing the operation of the HVAC system, the controller may also be used to monitor various components, also referred to as equipment, of the HVAC system. Thus, the controller can monitor components, such as, for example, a compressor, a condenser fan, and an ambient temperature sensor of the HVAC system.

In some embodiments, the controller may be used to set, for example, an operating mode, a set-point-temperature for the operating mode, a demand for the operating mode, indoor temperature of an enclosed space, and the like. The demand may be a demand for the HVAC system to condition the air such as, for example, a cooling demand or a heating demand. In a typical embodiment, a thermostat call is an example of the demand for the operating mode. The operating mode is a conditioning mode of the HVAC system such as, for example, a heating mode or a cooling mode.

For purpose of this patent application, a cooling setpoint or heating setpoint refers to a target temperature setting of the HVAC system as set by a user or an automatic target temperature setting based on a pre-defined schedule. Approaching the cooling setpoint occurs when the indoor temperature drops to reach the cooling setpoint or drops to reach the cooling setpoint within an acceptable range such as, for example, within 0.1 to 0.5 degrees of the cooling setpoint. Approaching the heating setpoint occurs when the indoor temperature rises to reach the heating setpoint or rises to reach the heating setpoint within an acceptable range such as, for example, within 0.1 to 0.5 degrees of the heating setpoint. The acceptable range can be based on various factors such as, for example, a type of the HVAC system, a model of the HVAC system, and the like.

Figure 1:
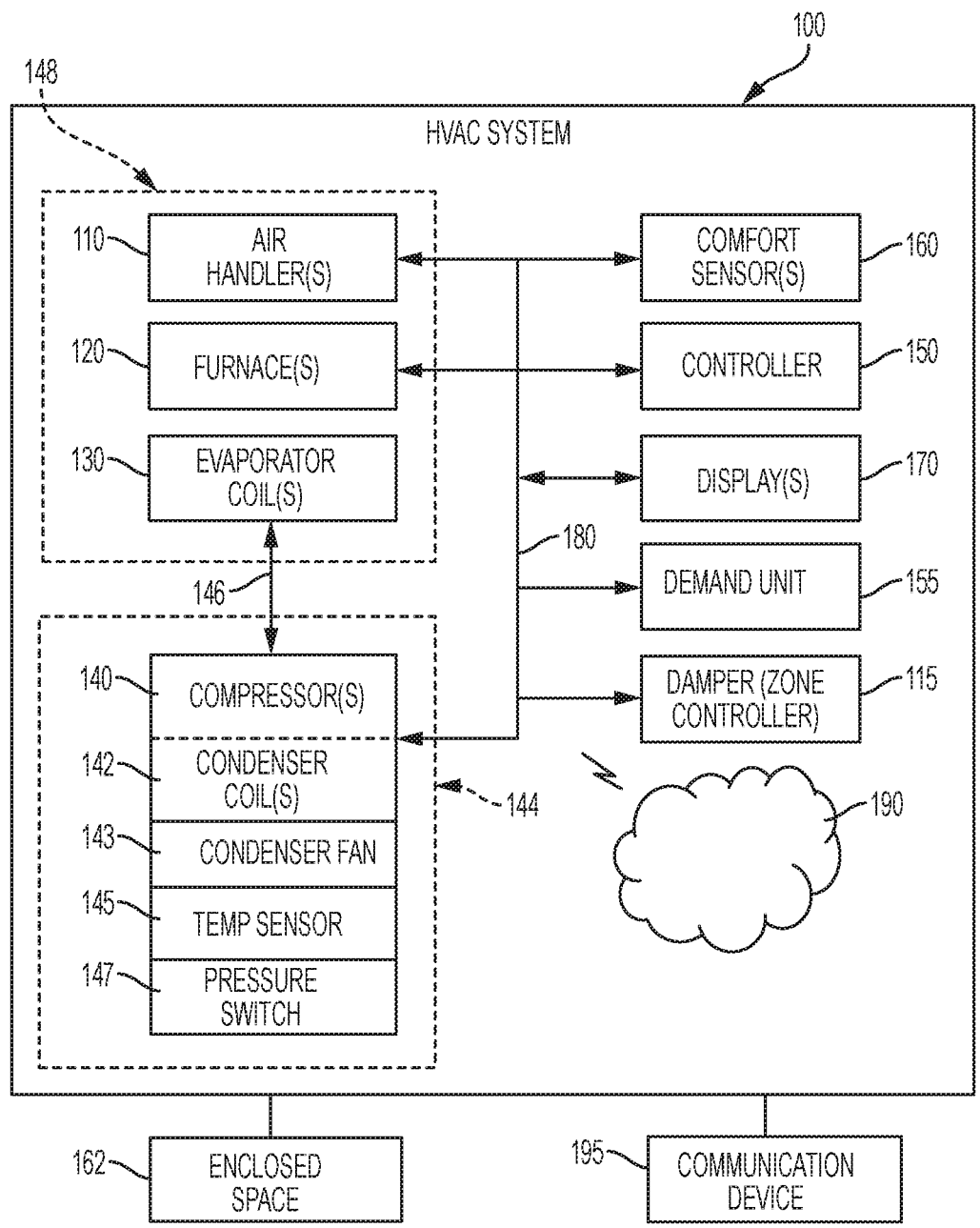
FIG. 1 illustrates an exemplary HVAC system.

FIG. 1 illustrates an exemplary HVAC system 100. In some embodiments, the HVAC system 100 is a networked HVAC system configured to condition air (e.g., heating, cooling, humidifying, or dehumidifying air) within an enclosed space 162. The enclosed space 162 may be, for example, a house, an office building, a warehouse, a server room, and the like. Thus, the HVAC system 100 can be a residential system or a commercial system, such as, for example, a rooftop system. For exemplary illustration, the HVAC system 100 includes various components. In other embodiments, the HVAC system 100 may include additional components that are not illustrated but are typically included within HVAC systems.

In some embodiments, the HVAC system 100 is configured to provide ventilation and therefore includes air handlers 110. In some embodiments, a damper 115 may be used with the HVAC system 100 to control air flow through air ducts. Such control may be used in various embodiments in which the HVAC system 100 is a zoned system. In some embodiments, the HVAC system 100 is configured to provide heating and therefore includes at least one furnace 120, typically associated with the air handlers 110. In some embodiments, the HVAC system 100 is configured to provide cooling and therefore includes evaporator coils 130, typically associated with the air handlers 110. Such an embodiment of the HVAC system 100 also includes a compressor 140 and associated condenser coils 142, which are typically associated with a so-called "outdoor unit" 144. For illustrative purposes, the HVAC system 100 includes one compressor 140; however, in other embodiments, the HVAC system 100 may include more than one compressor 140. The outdoor unit 144 may include a temperature sensor 145 and a pressure switch 147. For example, the temperature sensor 145 may be used to measure ambient temperature and the pressure switch 147 may be used to measure the threshold liquid pressure of the compressed refrigerant used by the HVAC system 100. As used herein, ambient temperature refers to the temperature of an environment surrounding the outdoor unit 144. In the context of the present application, "outdoor" is meant to indicate a location outside of the area being cooled.

The condenser coils 142 include a condenser fan 143. The condenser coils 142 operate as a liquid-to-air heat exchanger to dissipate heat from compressed refrigerant to air that passes around the condenser coils 142. The condenser fan 143 is configured to force air through the condenser coils 142, thereby increasing an ability of the condenser coils 142 to dissipate heat from the compressed refrigerant to air that passes around the condenser coils 142. Removing heat from the compressed refrigerant helps lower the liquid pressure of the compressed refrigerant. The compressor 140 and the associated condenser coils 142 are connected to the evaporator coils 130 by a refrigerant line 146. In some embodiments, the HVAC system 100 is configured to provide ventilation, heating and cooling, in which case the air handlers 110, the at least one furnace 120, and the evaporator coils 130 are associated with an "indoor unit" 148. In some embodiments, the indoor unit 148 may be a basement or attic unit that may also include air handlers 110.

The HVAC system 100 also includes a demand unit 155. For purposes of this patent application, the demand unit 155 is representative of the various units, such as, for example, the air handlers 110, the at least one furnace 120, and the compressor 140. The demand unit 155 provides a service in response to instructions by the controller 150. The service may be, for example, heating, cooling, humidification, dehumidification, and air circulation. The demand unit 155 may provide more than one service, and if so, one service may be a primary service, and another service may be an ancillary service. For example, for a heating unit that also circulates air, the primary service may be heating, and the ancillary service may be air circulation (e.g. by a blower).

The demand unit 155 may have a maximum service capacity associated therewith. For example, the at least one furnace 120 may have a maximum heat output (often expressed in terms of British Thermal Units (BTU) or Joules), or a blower may have a maximum airflow capacity (often expressed in terms of cubic feet per minute (CFM) or cubic meters per minute (CMM)). In some cases, the demand unit 155 may be configured to provide a primary or ancillary service in staged portions. For example, the blower may have two or more motor speeds, with a CFM value associated with each motor speed. In a typical embodiment, the motor speed of the blower is varied based upon the compressor speed. For example, as the compressor speed is increased, the blower speed is increased, and as the compressor speed is decreased, the blower speed is decreased.

The controller 150 is configured to control operation of at least one of the air handlers 110, the at least one furnace 120 and/or the compressor 140 to regulate the temperature of the enclosed space 162, at least approximately. In various embodiments, the HVAC system 100 includes a display 170 that provides additional functions such as operational, diagnostic, and status message display that allows an installer, user, or repairman to perform actions with respect to the HVAC system 100 more intuitively. Herein, the term "operator" will be used to refer collectively to any of the installer, the user, and the repairman unless otherwise specified.

A comfort sensor 160 may be associated with the controller 150 and may also optionally be associated with the display 170. The comfort sensor 160 provides environmental data, such as, for example, temperature and humidity, to the controller 150. In some embodiments, the comfort sensor 160 may be physically located within a same enclosure or housing as the controller 150. However, in other embodiments, the comfort sensor 160 may be located separately and physically remote from the controller 150.

Although not shown in FIG. 1, the HVAC system 100 may include a heat pump in lieu of or in addition to the at least one furnace 120 and the compressor 140. In some embodiments, a humidifier or dehumidifier may be employed to increase or decrease humidity. The damper 115 may be used to modulate air flow through ducts (not shown).

Finally, a data bus 180, which in the illustrated embodiment is a serial bus, couples the air handlers 110, the at least one furnace 120, the condenser coils 142, compressor 140, the controller 150, the comfort sensor 160, and the display 170 such that data may be communicated therebetween or thereamong. As will be understood, the data bus 180 may be advantageously employed to convey messages between components of the HVAC system 100. In some embodiments, the data bus 180 may also communicate with a communication device 195. All or some parts of the data bus 180 may be implemented as a wired network or as a wireless network 190.

In a typical embodiment, the data bus 180 may include any combination of hardware, software embedded in a computer readable medium, and/or encoded logic incorporated in hardware or otherwise stored (e.g., firmware) to couple components of the HVAC system 100 to each other. As an example and not by way of limitation, the data bus 180 may include an Accelerated Graphics Port (AGP) or other graphics bus, a controller area network (CAN) bus, a frontside bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCIX) bus, a serial advanced technology attachment (SATA) bus, a Video Electronics Standards Association local (VLB) bus, RS-485, Ethernet, or any other suitable bus or a combination of two or more of these. The data bus 180 may include any number, type, and/or configuration of buses 180, where appropriate. In particular embodiments, one or more buses 180 (which may each include an address bus and a data bus) may couple the controller 150 to other components of the HVAC system 100. In other embodiments, the connections between various components of the HVAC system 100 may be wired. For example, conventional cable and contacts may be used to couple the controller 150 to the various components. In some embodiments, a wireless connection may also be employed to provide at least some of the connections.

In a typical embodiment, the communication device 195 may be, for example, a non-HVAC device having a primary function that is not associated with HVAC systems. For example, non-HVAC devices include mobile computing devices that are configured to interact with the HVAC system 100 to monitor and modify at least some of the operating parameters thereof. Mobile computing devices may be, for example, a personal computer (e.g., desktop or laptop), tablet computer, mobile device (e.g., smart phone), and the like. In a typical embodiment, the communication device 195 includes at least one processor, memory and a user interface, such as a display. One skilled in the art will also understand that the communication device 195 disclosed herein includes other components that are typically included in such devices including a power supply, communications interface, and the like.

In order to provide cooling within the enclosed space 162, the HVAC system 100 may be used to remove heat from the enclosed space 162. Removal of heat is accomplished by allowing a compressed refrigerant to expand. As the compressed refrigerant expands, it absorbs heat. By allowing the compressed refrigerant to expand in, for example, the evaporator coils 130 and blowing air from the space around the evaporator coils 130, heat is absorbed from the air, thus cooling the air. To provide additional cooling, the expanded refrigerant may be recompressed by the compressor 140 and fed back to the evaporator coils 130. To increase an efficiency of the compressed refrigerant, the compressed refrigerant can be fed through the condenser coils 142 to dissipate some of the heat that was added to the refrigerant as a result of the work done to the refrigerant to compress it. As the compressed refrigerant passes through the condenser coils 142, the condenser fan 143 can be used to increase the efficiency of the condenser coils 142 by forcing air through fins of the condenser coils 142.

In typical HVAC systems 100, the operator sets a desired temperature of the enclosed space 162 via, for example, the controller 150. In some embodiments, the controller 150 may be a thermostat. When the temperature of the enclosed space 162 increases beyond the desired room temperature, the controller 150 communicates with the appropriate components of the HVAC system 100 to power-on the components in order to remove heat from the enclosed space 162. The HVAC system 100 then continues to run until the enclosed space 162 has been cooled to a temperature below the desired temperature (e.g., 1-3 degrees below the desired temperature). Once the room has been cooled, the controller 150 communicates with the components of the HVAC system 100 to power-off. Over an extended time period, the temperature of the enclosed space 162 may once again increase beyond the desired room temperature, in which case the controller 150 once again communicates with the appropriate components of the HVAC system 100 to power-on in order to remove unwanted heat from the enclosed space 162. This process may continue indefinitely depending on various conditions, such as, for example, the outside ambient temperature, the relative humidity, and the like. In some embodiments, the HVAC system 100 runs for extended periods of time without powering-off. For example, in order to satisfy some cooling demands (e.g., cooling a server room), it may be necessary to continuously run the HVAC system 100.

While the process disclosed above is generally acceptable, it results in repetitive power cycling of one or more components of the HVAC system 100 as the HVAC system 100 attempts to maintain the desired temperature within the enclosed space 162. For example, the compressor 140 and the condenser fan 143 are powered-on and off each time the controller 150 activates the HVAC system 100. Frequent cycling of the components of the HVAC system 100 creates additional wear resulting in premature equipment failure and reduced life of the HVAC system 100. However, when certain environment conditions are present (e.g., low ambient temperature) it may be possible to reduce or even eliminate power cycling of one or more components of the HVAC system 100. For example, depending upon the environment conditions, it may be possible to reduce or eliminate power cycling of the condenser fan 143 by either reducing or increasing an operating speed of the compressor 140. Altering behavior of the HVAC system 100 to ensure that the condenser fan 143 is either always powered-off or powered-on eliminates cycling of the condenser fan 143, which ultimately reduces the likelihood of equipment failure.

Figure 2A:
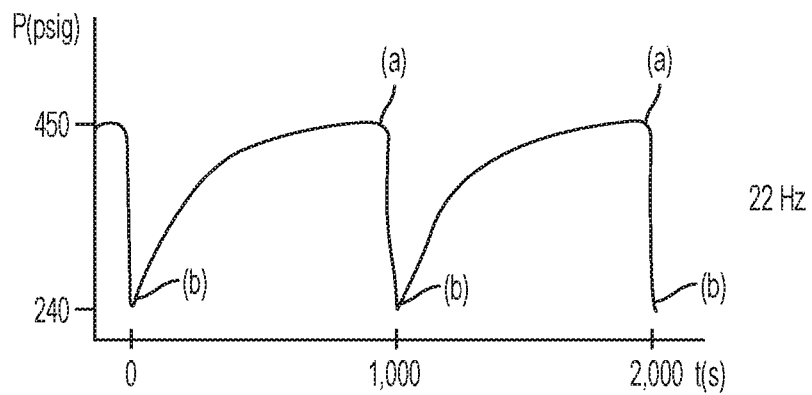
FIGS. 2A-2C are exemplary graphs illustrating condenser-fan cycling for a compressor operating at three different speeds.
Figure 2B:
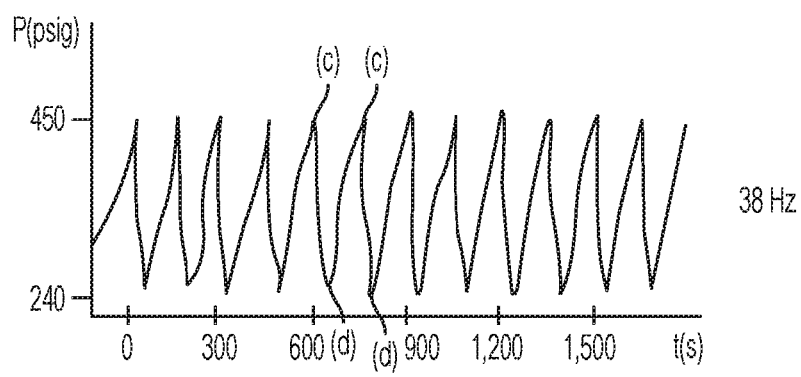
Figure 2C:
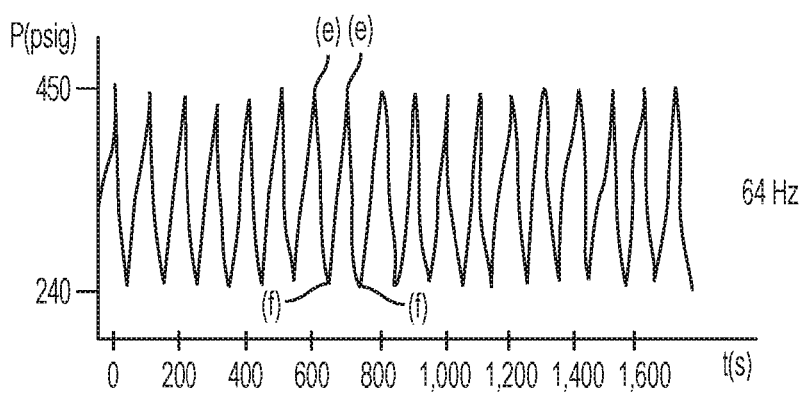

FIGS. 2A-2C are exemplary graphs illustrating condenser-fan cycling for a compressor operating at three different speeds. For illustrative purposes, FIGS. 2A-2C will be described relative to a 3 ton HVAC system 100 of FIG. 1. Referring now to FIG. 2A, an exemplary graph of liquid pressure versus time for the compressor 140 operating at a speed of 22 Hz in ambient air of 50° F. is shown. During operation of the HVAC system 100, the liquid pressure of the compressed refrigerant varies depending upon various conditions, such as, for example, the operating speed of the compressor 140 and an ambient temperature of the area surrounding the compressor 140 and the condenser coils 142. Due to system limitations and design parameters, the HVAC system 100 has a minimum acceptable liquid pressure and a maximum acceptable liquid pressure. If the liquid pressure drops below the minimum acceptable liquid pressure, the compressor 140 may begin to have operational problems. If the liquid pressure increases beyond the maximum acceptable liquid pressure, mechanical systems within the HVAC system 100 may fail. To avoid the issues associated with operating the HVAC system 100 below the minimum acceptable liquid pressure and above the maximum acceptable liquid pressure, the condenser coils 142 and the condenser fan 143 are typically used to maintain a liquid pressure between the minimum acceptable liquid pressure and the maximum acceptable liquid pressure.

For example, the HVAC system 100 of FIGS. 2A-2C may be set to operate with a minimum acceptable liquid pressure of about 240 psig and a maximum acceptable liquid pressure of about 450 psig. In other embodiments, the acceptable minimum and maximum liquid pressures may be adjusted depending on various design parameters. During operation of the exemplary 3 ton HVAC system 100, the liquid pressure of the compressed refrigerant is monitored. The liquid pressure of the compressed refrigerant may be monitored or determined in various ways. For example, the HVAC system 100 may monitor the liquid pressure with a pressure switch, a pressure transducer, and the like. In some embodiments, the liquid pressure may be calculated by monitoring the temperature of the compressed refrigerant. The temperature of the compressed refrigerant may be monitored in a variety of ways, such as, for example, external temperature sensors, in-line temperature sensors, and the like. If the liquid pressure reaches the maximum acceptable liquid pressure (e.g., 450 psig), a pressure threshold or limit is crossed. When using the pressure switch 147, crossing the pressure threshold causes the pressure switch 147 to trip. When the pressure switch 147 is tripped, a circuit is closed and the condenser fan 143 is powered-on. When the condenser fan 143 is powered on, the condenser fan 143 forces ambient air through the condenser coils 142 to cool refrigerant that has been compressed by the compressor 140. As heat is removed from the compressed refrigerant, the liquid pressure of the compressed refrigerant drops. If the condenser coils 142 are able to remove enough heat from the compressed refrigerant to reduce the liquid pressure down to the minimum acceptable liquid pressure (e.g., 240 psig), the pressure switch 147 opens and the condenser fan 143 is powered-off. Once the condenser fan 143 powers-off, the liquid pressure of the compressed refrigerant begins to rise. If the liquid pressure rises back to the maximum acceptable liquid pressure, the pressure switch 147 is again tripped and the condenser fan 143 powers-on. As will be recognized by those having skill in the art, various devices or methods may be substituted for the pressure switch 147. For example, a pressure transducer may be used to monitor the liquid pressure of the compressed refrigerant. Responsive to the liquid pressure reaching the acceptable maximum/minimum pressure, the pressure transducer can send a signal to the controller 150 or directly to the condenser fan 143 to cause the condenser fan 143 to power on/off as desired.

As shown in FIG. 2A, beginning at time t=0 s, the liquid pressure is approximately 240 psig and the condenser fan 143 is powered-off. As time passes (i.e., as the compressor continues to run), the liquid pressure increases. Once the liquid pressure reaches approximately 450 psig at approximately t=1,000 s (indicated by (a) on the graph), a pressure switch is tripped and the condenser fan 143 is powered-on. Running the condenser fan 143 increases air flow around the condenser coils 142 to increase the amount of heat dissipated from the compressed refrigerant to the air as the compressed refrigerant passes through the condenser coils 142. The condenser fan 143 continues to operate in order to remove heat from the compressed refrigerant until the liquid pressure decreases to approximately 240 psig, at which point the condenser fan 143 is powered-off (indicated by (b) on the graph). The time period between successive peaks (i.e., from one (a) to the next (a)) is defined as one condenser-fan cycle. As shown, a condenser-fan cycle time of FIG. 2A is approximately 1,000 seconds.

Referring now to FIG. 2B, a graph of liquid pressure versus time for the compressor 140 operating at a speed of 38 Hz in ambient air of 50° F. is shown. FIG. 2B is similar to FIG. 2A; however, in FIG. 2B the time interval for the liquid pressure to reach 450 psig (indicated by (c) on the graph) is reduced because running the compressor 140 at a faster operating speed of 38 Hz increases the amount of work done to the refrigerant by the compressor 140. In general, increasing the operating speed of the compressor 140 causes the compressor 140 to compress the refrigerant at a faster rate. By compressing the refrigerant at a faster rate, a flow rate of the compressed refrigerant increases, which enables the HVAC system 100 to satisfy more cooling demand. A byproduct of increasing the flow rate of the compressed refrigerant is that the liquid pressure of the compressed refrigerant increases more quickly due to the additional heat added to the refrigerant as it is more rapidly compressed. Over time, the heat and pressure of the compressed refrigerant builds and eventually the maximum acceptable liquid pressure is reached. In general, the time it takes for the compressed refrigerant to reach the maximum acceptable liquid pressure decreases as the operating speed of the compressor 140 increases. Compared to FIG. 2A, the condenser-fan cycle time has been reduced from approximately 1,000 seconds to approximately 150 seconds.

Referring now to FIG. 2C, a graph of liquid pressure versus time for the compressor 140 operating at a speed of 64 Hz in ambient air of 50° F. is shown. FIG. 2C is similar to FIGS. 2A and 2B; however, the time interval for the liquid pressure to reach 450 psig (indicated by (e) on FIG. 2C) is reduced due to an increase in the amount of work done to the refrigerant by the compressor 140 to compress the refrigerant when the operating speed of the compressor is increased to 64 Hz. Compared to FIG. 2B, the condenser-fan cycle time has been reduced from approximately 150 seconds to approximately 100 seconds.

A comparison of the data from FIGS. 2A-2C shows that, at an ambient temperature of 50° F., operating the compressor 140 at the 22 Hz operating speed results in fewer cycles of the condenser fan 143 compared to running the compressor 140 at the operating speed of either 38 Hz or 64 Hz. Therefore, it is preferable to run the compressor 140 at the slower 22 Hz operating speed to reduce the number of condenser-fan cycles for a given period of time. However, under certain conditions, running the compressor 140 at the slower operating speed of 22 Hz may not be sufficient to satisfy a particular cooling demand. If the cooling demand is not met at the 22 Hz operating speed, then the operating speed of the compressor 140 can be increased as necessary to meet the cooling demand.

Figure 3A:
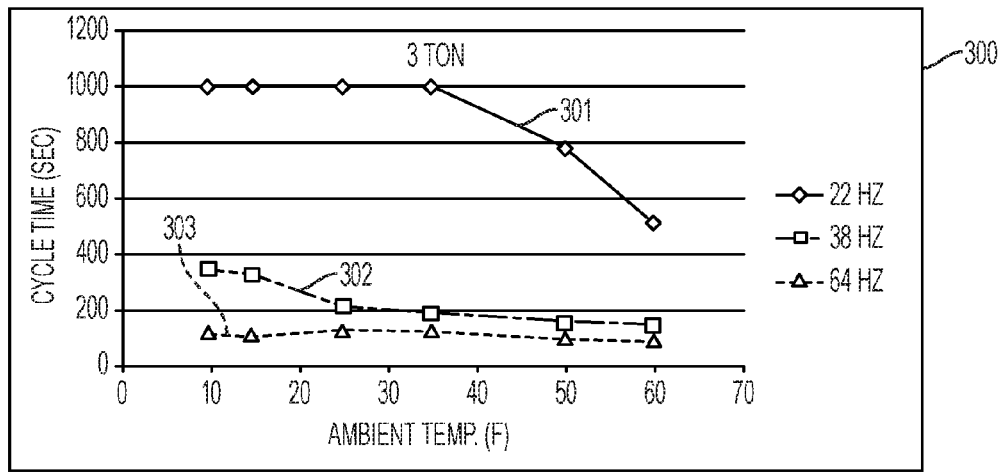
FIGS. 3A and 3B illustrate an effect of ambient temperature and an operating speed of a compressor on condenser-fan cycle time and condenser-fan state, respectively, for a 3 ton HVAC system according to exemplary embodiments.
Figure 3B:
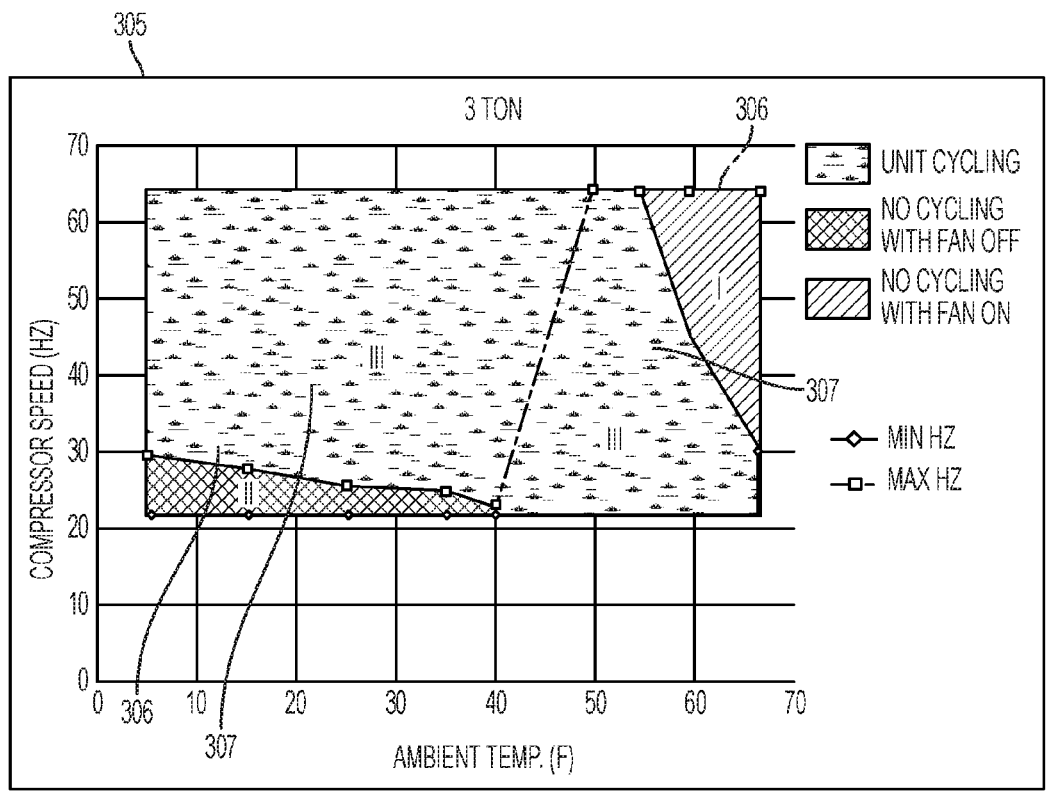

FIGS. 3A and 3B illustrate an effect of ambient temperature and operating speed of the compressor 140 on condenser-fan cycle time and condenser-fan state for a 3 ton HVAC system. For illustrative purposes, FIGS. 3A and 3B will be described relative to the HVAC system 100 of FIG. 1. In FIG. 3A, a graph 300 shows condenser-fan cycle times for a 3 ton HVAC system 100 operating in ambient temperatures between 10° F. and 60° F. Line 301 identifies condenser-fan cycle times at various ambient temperatures for the compressor 140 operating at a 22 Hz operating speed. Line 302 identifies condenser-fan cycle times at various ambient temperatures for the compressor 140 operating at a 38 Hz operating speed. Line 303 identifies condenser-fan cycle times at various ambient temperatures for the compressor 140 operating at a 64 Hz operating speed.

Looking first at the line 301, when the compressor 140 operates at 22 Hz operating speed and an ambient temperature of approximately 60° F., a condenser-fan cycle time of approximately 550 seconds is indicated. As the ambient temperature decreases, the condenser-fan cycle time increases as illustrated in FIG. 3A. The increase in condenser-fan cycle time is a result of an increase in the ability of the condenser coils 142 to passively dissipate heat (e.g., the condenser coil's ability to dissipate heat from the compressed refrigerant when the condenser fan 143 is powered-off) due to the lower ambient temperature. At ambient temperatures of approximately 35° F. or below, no condenser-fan cycling was noticed (this is indicated as a flat line at a value of t=1,000 seconds). An infinite condenser-fan cycle time occurs when the liquid pressure of the compressed refrigerant either never reaches the acceptable maximum liquid pressure of 450 psig, or when, after the acceptable maximum liquid pressure has been reached, the liquid pressure never falls back down to the acceptable minimum liquid pressure of 240 psig. At an ambient temperature of 35° F., the liquid pressure never reaches the maximum acceptable liquid pressure because the passive-cooling ability of the condenser coils 142 are sufficient to prevent the compressed refrigerant from reaching a liquid pressure of 450 psig.

Looking now at the line 302, when the compressor 140 operates at the 38 Hz operating speed and an ambient temperature between approximately 25° F. and 60° F., a condenser-fan cycle time of approximately 180 seconds is shown. Compared to running the compressor 140 at the 22 Hz operating speed, running the compressor 140 at the 38 Hz operating speed results in shorter condenser-fan cycle times. At an ambient temperature below approximately 25° F., the condenser-fan cycle time begins to increase. The increase in condenser-fan cycle time is a result of an increase in the passive-cooling ability of the condenser coils 142 due to the reduction in ambient temperature.

Looking now at the line 303, when the compressor 140 operates at the 64 Hz operating speed and an ambient temperature between approximately 10° F. to 60° F., a condenser-fan cycle time of approximately 120 seconds is shown. When the compressor 140 operates at the 64 Hz operating speed, the condenser-fan cycle time is relatively consistent across an ambient-temperature range of 10° F. to 60° F. because of the increased amount of work done by the compressor 140 to compress the refrigerant at the faster compressor speed. At the faster 64 Hz operating speed, even an ambient temperature of 10° F. is not enough to overcome the increased amount of work done by the compressor 140 to compress the refrigerant.

Referring now to FIG. 3B, a graph 305 of condenser-fan cycling for a 3 ton HVAC system 100 of FIG. 3A is shown in relation to an operating speed of the compressor 140 and ambient temperature. In FIG. 3B, Region I indicates conditions where the condenser fan 143 is powered-on and does not cycle (i.e., the condenser fan 143 is powered-on and does not power-off). Region II indicates conditions where the condenser fan 143 is powered-off and does not cycle (i.e., the condenser fan 143 never powers-on and remains off). Region III indicates conditions where the condenser fan 143 cycles between powered-on and powered-off states.

Looking first at Region I, the condenser fan 143 remains in a powered-on state with no cycling. Region I is defined by the area between line 306 (indicated by "square" data points), line 307 (indicated by "diamond" data points), and ambient temperatures of between approximately 55° F. and 65° F. Line 306 represents the maximum compressor speed at a given temperature to avoid cycling of the condenser fan 143 and line 307 represents the minimum compressor speed at a given temperature to avoid cycling of the condenser fan 143. In Region I, the work done by the compressor 140 to compress the refrigerant is sufficient to raise the compressed refrigerant's liquid pressure to 450 psig, which triggers the condenser fan 143 to power-on. However, the ambient temperature within Region I is high enough that the condenser coils 142 are unable to dissipate enough heat to lower the liquid pressure to 240 psig. Because the liquid pressure never falls to 240 psig, the condenser fan 143 does not power-off.

Looking now at Region II, the condenser fan 143 is in a powered-off state with no cycling. Region II is defined by the area between line 306, line 307, and ambient temperatures of between approximately 5° F. to 40° F. In Region II, the compressor 140 is operating at reduced operating speeds, which results in less work being done to compress the refrigerant by the compressor 140. The reduced work combined with low ambient temperatures improves the passive cooling ability of the condenser coils 142 and results in conditions where the maximum acceptable liquid pressure of 450 psig is never reached. Because the maximum acceptable liquid pressure of 450 psig is never reached, the condenser fan 143 never powers-on.

Looking now at Region III, the condenser fan 143 is in a cycling state. Region III comprises the area not defined by Regions I and II. The conditions within Region III are such that the work done by the compressor 140 to compress the refrigerant causes the liquid pressure to reach the maximum acceptable liquid pressure of 450 psig, which causes the condenser fan 143 to power-on. Unlike Region I, the combination of operating speed of the compressor 140 and ambient temperature are such that the condenser coils 142 are able to dissipate enough heat from the compressed refrigerant to reduce the liquid pressure to the minimum acceptable liquid pressure of 240 psig, which causes the condenser fan 143 to power-off. Once the condenser fan 143 powers-off, the liquid pressure will again rise to the maximum acceptable liquid pressure and the condenser fan 143 will again power-on. This cycling of the condenser fan 143 results in additional wear on the condenser fan 143 that can lead to premature failure of the condenser fan 143. As seen in FIG. 3B, the lines 306 and 307 for the 3 ton HVAC system 100 are shown to converge between ambient temperatures of approximately 40-50° F. It should be noted that the behavior of lines 306 and 307 may vary for different HVAC systems depending on various system parameters. For the HVAC System 100 of FIG. 3B, there is no compressor speed value that will result in an elimination of condenser-fan cycling between ambient temperatures of approximately 40-50° F. For other 3 ton systems, it is possible that the lines 306 and 307 could appear more like lines 506 and 507 shown in FIG. 5B (i.e., lines that do not completely converge between Regions I and II).

When ambient temperatures permit, it is preferable to operate the compressor 140 at an operating speed that results in the HVAC system 100 running within Regions I or II. For example, at an ambient temperature of 20° F., it is preferable to run the compressor 140 at an operating speed between approximately 22 Hz and approximately 26 Hz. At an ambient temperature of 60° F., it is preferable to run the compressor 140 at an operating speed between approximately 45 Hz and approximately 64 Hz. While it is preferable to run the compressor 140 at these operating speeds for the 3 ton HVAC system 100 demonstrated, cooling demand may dictate that the system operate outside of Regions I or II. For example, if the ambient temperature is 20° F., it may be preferable to run the compressor 140 at 22 Hz. However, if the HVAC system 100 is required to maintain a specific temperature within the enclosed space 162, it may be necessary to run the compressor 140 at an operating speed beyond the recommended 22-26 Hz speed to ensure that the cooling demand for the room is met.

Figure 4A:
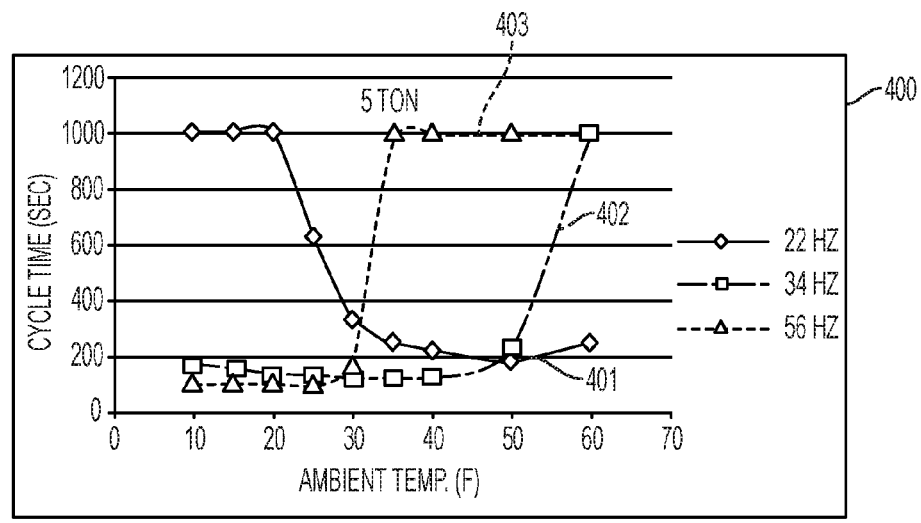
FIGS. 4A and 4B illustrate an effect of ambient temperature and an operating speed of the compressor on condenser-fan cycle time and condenser-fan state, respectively, for a 5 ton HVAC system according to exemplary embodiments.
Figure 4B:
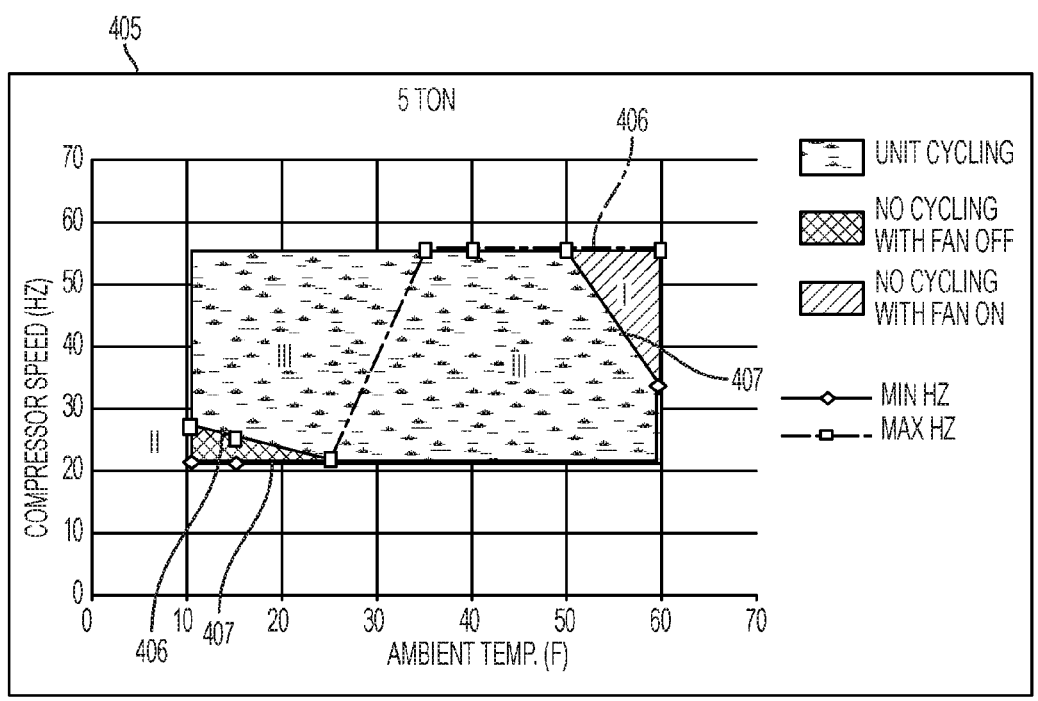

FIGS. 4A and 4B illustrate an effect of ambient temperature and operating speed of the compressor 140 on condenser-fan cycle time and condenser-fan state, respectively, for a 5 ton HVAC system. For illustrative purposes, FIGS. 4A and 4B will be described relative to the HVAC system 100 of FIG. 1. Referring to FIG. 4A, a graph 400 shows condenser-fan cycle times for a 5 ton HVAC system 100 operating in ambient temperatures between approximately 10-60° F. Line 401 identifies condenser-fan cycle times at various ambient temperatures for the compressor 140 operating at a 22 Hz operating speed. Line 402 identifies condenser-fan cycle times at various ambient temperatures for the compressor 140 operating at a 38 Hz operating speed. Line 403 identifies condenser-fan cycle times at various ambient temperatures for the compressor 140 operating at a 56 Hz operating speed.

Looking first at line 401, when the compressor 140 operates at the 22 Hz operating speed and an ambient temperature of 60° F., a condenser-fan cycle time of approximately 250 seconds is indicated. As the ambient temperatures decreases, the condenser-fan cycle time generally increases as illustrated in FIG. 4A. The increase in condenser-fan cycle time is a result of an increase in the ability of the condenser coils 142 to passively dissipate heat from the compressed refrigerant due to lower ambient temperatures. At approximately 20° F., no condenser-fan cycling occurs. Reducing the ambient temperature below 20° F. results in a state of no condenser-fan cycling (this is indicated as a flat line at a value of t=1,000 seconds). In FIG. 4A, the maximum acceptable liquid pressure is never reached below an ambient temperature of 20° F. at the 22 Hz operating speed because the passive-cooling ability of the condenser coils 142 is sufficient to cool the compressed refrigerant to maintain a liquid pressure of less than 450 psig.

Looking now at line 402, when the compressor 140 operates at the 34 Hz operating speed and an ambient temperature of 60° F., no condenser fan cycling was noticed. In comparison to running the compressor 140 at the 22 Hz operating speed, running the compressor 140 at the 34 Hz operating speed results no cycling of the condenser fan 143 because of the extra work done by the compressor 140 to compress the refrigerant when the compressor 140 runs at the faster 34 Hz operating speed. The extra work done by the compressor 140 results in an operating condition where the condenser coils 142 are unable to cool the compressed refrigerant to reduce the liquid pressure to the minimum acceptable liquid pressure of 240 psig. At an ambient temperature of 50° F., the condenser-fan cycle time has reduced to approximately 250 seconds. At 50° F., the ambient temperature has fallen enough that the condenser coils 142 are able to cool the compressed refrigerant to reduce the liquid pressure to 240 psig. At ambient temperatures between approximately 10° F. to approximately 40° F., the condenser-fan cycle time is relatively constant at approximately 170 seconds.

Looking now at line 403 when the compressor 140 operates at a 56 Hz operating speed, no condenser fan cycling is observed across a temperature range of approximately 35° F. to approximately 60° F. In comparison to operating the compressor 140 at the 34 Hz operating speed, operating the compressor 140 at the 56 Hz operating speed results in even more work being done to the refrigerant by the compressor 140. In order for the condenser-fan cycle time to transition from infinite to finite, a lower ambient temperature is required. At the 56 Hz operating speed, the transition from infinite to finite condenser-fan cycle time occurs at approximately 35° F. From approximately 10-30° F., the condenser-fan cycle time is relatively constant at approximately 160 seconds.

Referring now to FIG. 4B, a graph 405 of condenser-fan cycling for the 5 ton HVAC system 100 of FIG. 4A is shown in relation to operating speed of the compressor 140 and ambient temperature. Similar to FIG. 3B, FIG. 4B includes Regions I, II, and III that are defined by line 406 and line 407. Line 406 represents the maximum compressor speed at a given temperature to avoid cycling of the condenser fan 143 and line 407 represents the minimum compressor speed at a given temperature to avoid cycling of the condenser fan 143. Region I is defined by the area between the line 406, the line 407, and between ambient temperatures of approximately 50-60° F. Region II is defined by the area between the line 406, the line 407, and between ambient temperatures of approximately 10-25° F. Region III comprises the area not defined by Regions I and II. As shown in FIG. 4B, the lines 406 and 407 for the 5 ton HVAC system 100 are shown to converge between ambient temperatures of approximately 25-50° F. It should be noted that the behavior of lines 406 and 407 may vary for different HVAC systems depending on various system parameters. For the HVAC System 100 of FIG. 4B, there is no compressor speed value that will result in an elimination of condenser-fan cycling between ambient temperatures of approximately 25-50° F. For other 5 ton systems, it is possible that the lines 406 and 407 could appear more like lines 506 and 507 shown in FIG. 5B (i.e., lines that do not completely converge between Regions I and II).

Figure 5A:
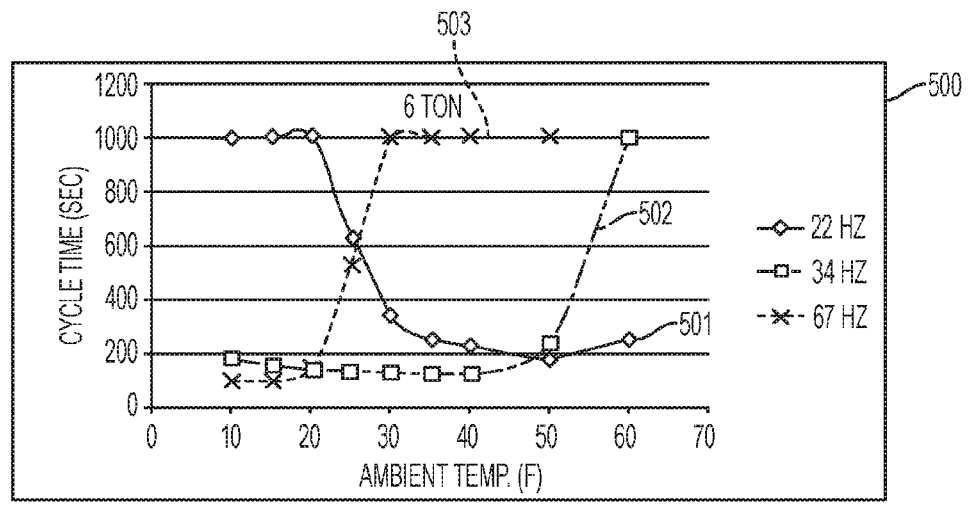
FIGS. 5A and 5B illustrate an effect of ambient temperature and an operating speed of a compressor on condenser-fan cycle time and condenser-fan state, respectively, for a 6 ton HVAC system according to exemplary embodiments.
Figure 5B:
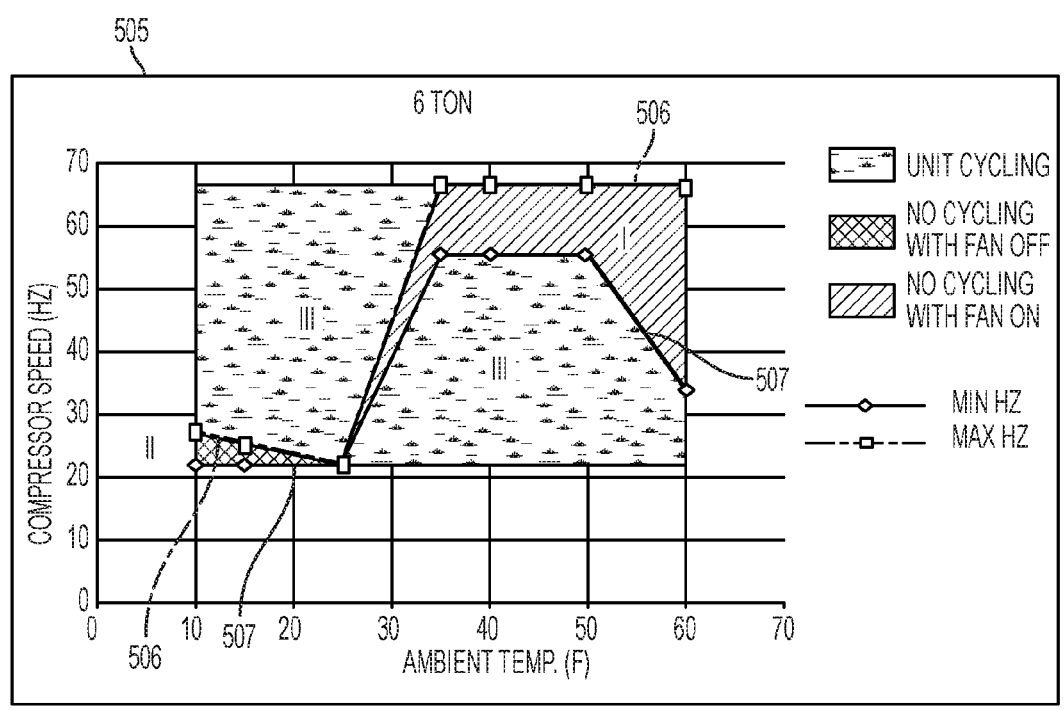

FIGS. 5A and 5B illustrate an effect of ambient temperature and an operating speed of the compressor on condenser-fan cycle time and condenser-fan state, respectively, for a 6 ton HVAC system. For illustrative purposes, FIGS. 5A and 5B will be described relative to the HVAC system 100 of FIG. 1. The 6 ton HVAC system 100 of FIGS. 5A and 5B is identical to the 5 ton system of FIGS. 4A and 4B. The only difference is that, for the 6 ton system, the compressor 140's maximum allowable operating speed has been raised from 56 Hz to 67 Hz. As a result, the data in FIG. 5A for the operating speeds of 22 Hz and 34 Hz is the same as the data from FIG. 4A. The data for the 67 Hz operating speed is similar to the data for the 56 Hz operating speed, but, because of the additional work being done to compress the refrigerant at the faster 67 Hz operating speed, the compressor 140 remains in a state where the condenser fan 143 does not cycle until ambient temperatures of below approximately 30° F. (down from approximately 35° F. for the 5 ton system).

Referring now to FIG. 5B, condenser-fan cycling for the 6 ton HVAC system 100 of FIG. 5A is shown in relation to an operating speed of the compressor 140 and ambient temperature. FIG. 5B similarly includes Regions I, II, and III. Region I is defined by the area between line 506, line 507, and between ambient temperatures of approximately 25-60° F. Region II is defined by the area between the line 506, the line 507, and between ambient temperatures of approximately 10-25° F. Region III comprises the area not defined by Regions I and II. Again, the data in FIG. 5B is similar to the data from FIG. 4B. However, the graph is extended to account for the faster maximum operating speed of the compressor 140. As a result of the faster operating speed, Region I in FIG. 5B has grown compared to Region I from FIG. 4B. The area of Region I in FIG. 5B is larger than that of Region I from FIG. 4B due to the additional work that is done by the compressor 140 when running at the faster 67 Hz operating speed. Region II of FIG. 5B is comparable to Region II of FIG. 4B because the minimum operating speeds for the identical 5 ton and 6 ton HVAC systems 100 are the same for both systems.

The data from FIGS. 3A-3B, 4A-4B, and 5A-5B provides some insight regarding preferred operating speeds for the compressor 140 based upon different ambient temperatures for each of the 3 ton, 5 ton, and 6 ton HVAC systems 100. Table 1 below identifies suggested starting operating speeds for the compressor 140 for ambient temperatures of 10° F., 35° F., and 60° F.

TABLE 1

| Ambient Temperature | 3 Ton | 5 Ton | 6 Ton |
|---|---|---|---|
| 10° F. | Minimum Compressor Speed (22 Hz) | Minimum Compressor Speed (22 Hz) | Minimum Compressor Speed (22 Hz) |
| 35° F. | Minimum Compressor Speed (22 Hz) | Maximum Compressor Speed (56 Hz) | Maximum Compressor Speed (67 Hz) |
| 60° F. | Maximum Compressor Speed (64 Hz) | Maximum Compressor Speed (56 Hz) | Maximum Compressor Speed (67 Hz) |

The suggested starting operating speeds for the compressor 140 listed in Table 1 were chosen to limit the number of pressure cycles the compressor 140 experiences and to limit or eliminate cycling of the condenser fan 143. For example, at 10° F. the 3 ton HVAC system 100 should be started at its minimum compressor speed of, for example, 22 Hz. FIG. 3B shows that for 10° F. ambient temperature the suggested compressor speed of 22 Hz locates the 3 ton HVAC 100 system in Region II (i.e., condenser fan 143 powered-off with no cycling). After the HVAC system 100 has been running, adjustments to the operating speed of the compressor 140 may be made to satisfy various system requirements. For example, adjustments to the operating speed of the compressor 140 can be made to satisfy a desired cooling demand. The minimum and maximum compressor speeds vary depending on various design parameters of the compressor 140 and the HVAC system 100.

Figure 6:
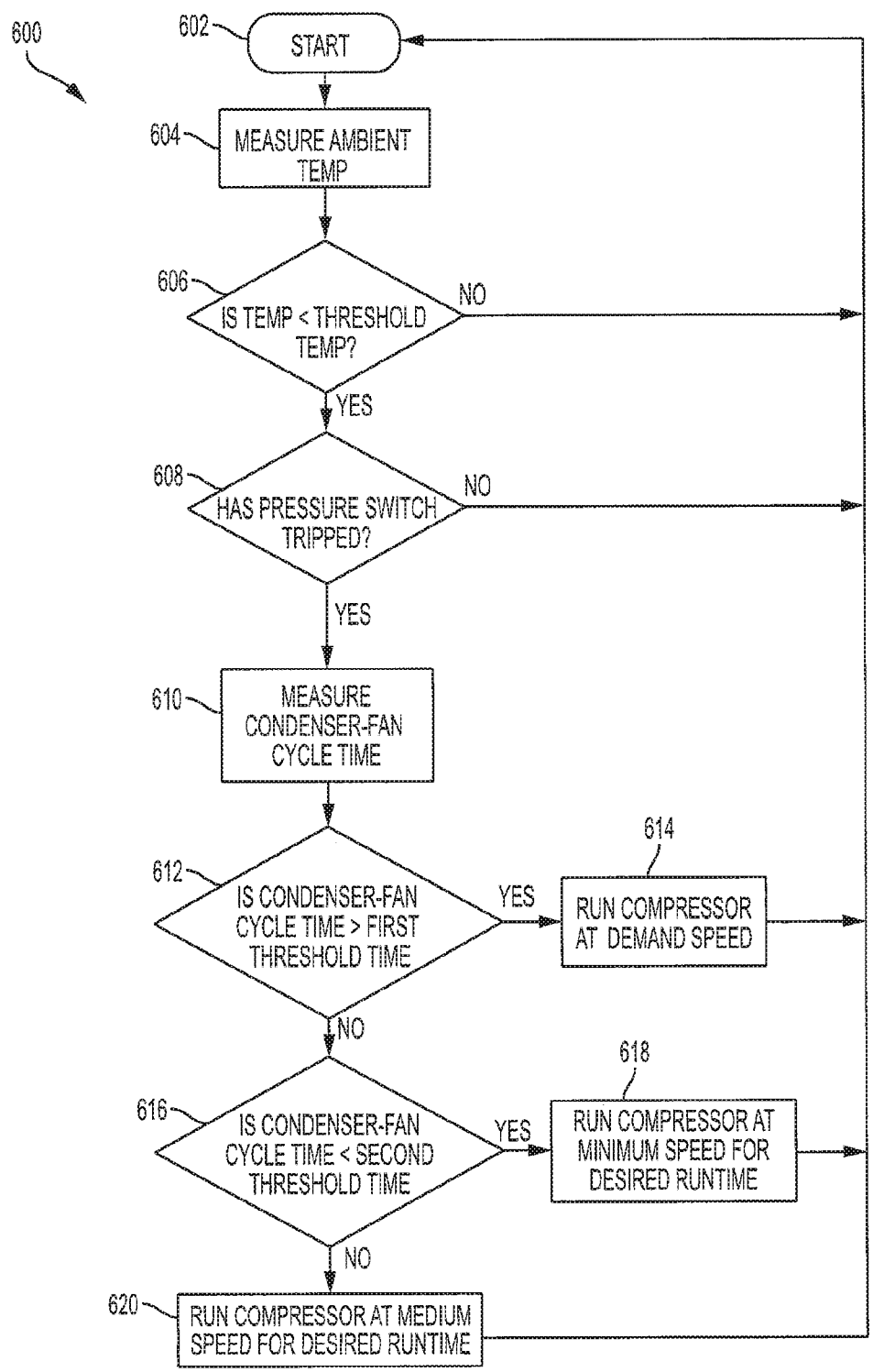
FIG. 6 is a flow chart illustrating an exemplary process for selecting an operating speed of a compressor operating at low ambient temperatures.

FIG. 6 is a flowchart illustrating a process 600 of selecting an operating speed for a compressor operating in low ambient temperatures. In general, the process 600 monitors the HVAC system 100 to identify, when possible, a compressor speed or range of compressor speeds that will allow the HVAC system 100 to operate without cycling of the condenser fan 143 (i.e., the condenser fan remains powered on or off, but does not cycle). For example, for the 3 ton HVAC system 100 of FIG. 3B, it can be seen that there is no compressor speed available for ambient temperatures between approximately 40-50° F. to establish a no-cycling condition. When a compressor speed to avoid cycling of the condenser fan 143 is unavailable, the controller 150 sets the compressor 140 to operate at a demand speed. The demand speed is determined by the HVAC system 100 and is the compressor speed needed to meet a desired cooling demand.

For illustrative purposes, the process 600 will be described relative to the HVAC system 100 of FIG. 1. The process 600 described below can be carried out by, for example, the controller 150. For the example described below, the HVAC system 100 is a 3 ton system discussed above relative to FIGS. 3A and 3B. The process 600 is applicable to other HVAC systems, such as, for example, the 5 ton system of FIGS. 4A and 4B and the 6 ton system of FIGS. 5A and 5B. The process 600 begins at step 602. At step 602 the HVAC system 100 begins to operate. In some embodiments, an initial operating speed of the compressor 140 may be selected based upon Table 1 above. After the HVAC system 100 has begun operating, the process 600 proceeds to step 604.

At step 604, the ambient temperature of the area surrounding the condenser coils 142 is measured. The ambient temperature may be determined in various ways. In some embodiments, the ambient temperature may be measured via the temperature sensor 145 associated with the HVAC system 100. In other embodiments, the HVAC system 100 may receive the ambient temperature from an external source, such as, for example, the communication device 195. After the ambient temperature is measured, the process 600 proceeds to step 606. At step 606, the controller 150 determines if the measured ambient temperature is below a predetermined threshold temperature. The predetermined threshold temperature may be selected based on various system parameters and design considerations. In the exemplary embodiment, the predetermined threshold temperature may be set to, for example, 60° F. In some embodiments, an operating speed of the condenser fan 143 may be set to its lowest speed. Lowering the operating speed of the condenser fan 143 reduces the likelihood that the condenser fan will be in a state of cycling because, when the condenser fan 143 is operating at the lower operating speed, less heat is rejected by the condenser coils 142. If it is determined at step 606 that the measured temperature is not below the predetermined threshold temperature, the process 600 proceeds to step 602. However, if it is determined at step 606 that the measured temperature is below the predetermined threshold temperature, the process 600 proceeds to step 608.

At step 608, the controller 150 monitors the pressure switch 147 to determine whether a trip condition exists. In some embodiments, in addition to monitoring the pressure switch 147, the controller 150 sets an operating speed of the condenser fan 143 to its minimum operating speed. Setting the condenser fan 143 to operate at its minimum operating speed helps prevent cycling conditions. A trip condition occurs when the liquid pressure of the compressed refrigerant in the HVAC system 100 reaches a maximum acceptable liquid pressure. When the trip condition occurs, the pressure switch 147 closes a circuit that powers-on the condenser fan 143. The maximum acceptable liquid pressure may be selected based on various system parameters and design considerations. For example, a maximum acceptable liquid pressure of 450 psig may be selected. The pressure switch 147 remains tripped until the liquid pressure of the refrigerant falls back to a minimum acceptable liquid pressure. The minimum acceptable liquid pressure may be selected based on various system parameters and design considerations. For example, a minimum acceptable liquid pressure of 240 psig may be selected. If it is determined at step 608 that the pressure switch 147 has not been tripped, the process 600 returns to step 602. However, if it is determined at step 608 that the pressure switch 147 has been tripped, the process 600 proceeds to step 610.

At step 610, the controller 150 starts a timer to measure a condenser-fan cycle time of the compressor 140. The condenser-fan cycle time of the compressor 140 is calculated as the time period between successive trips of the pressure switch 147. The timer runs until a second trip of the pressure switch 147 occurs. Once the pressure switch 147 has been tripped a second time, the condenser-fan cycle time is stored by the controller 150. In some embodiments, the timer may continue to run to measure subsequent condenser-fan cycle times. After the second trip of the pressure switch 147 has occurred, the process 600 then proceeds to step 612.

At step 612, the controller 150 compares the condenser-fan cycle time that was measured in step 610 with a first threshold condenser-fan cycle time. The first threshold condenser-fan cycle time may be selected based upon various system parameters. In general, a value of the first threshold condenser-fan cycle time is selected to identify long condenser-fan cycle times. For example, a value of 300 seconds may be chosen. As shown in FIG. 3A, a condenser-fan cycle time of 300 seconds or more suggests that the ambient temperature is low. If it is determined at step 612 that the condenser-fan cycle time is greater than the first threshold condenser-fan cycle time, the process 600 proceeds to step 614. At step 614, the compressor 140 is allowed to continue operating at the demand speed for the desired runtime. For the compressor 140 associated with the HVAC system 100 of FIG. 3B, the compressor 140 is allowed to operate at the demand speed because, as indicated by the condenser-fan cycle time being greater than the first threshold condenser-fan cycle time, the condenser fan 143 is already operating in a no-cycling state. However, if it is determined at step 612 that the condenser-fan cycle time is less than the first threshold condenser-fan cycle time, then the process 600 proceeds to step 616.

At step 616, the controller 150 compares the condenser-fan cycle time that was measured at step 610 with a second threshold condenser-fan cycle time. The second threshold condenser-fan cycle time may be selected based upon various system parameters, but is a value less than the first threshold condenser-fan cycle time. In general, the second threshold condenser-fan cycle time is selected to identify short compressor-cycles times. For example, a value of 120 seconds may be chosen. As shown in FIG. 3A, a condenser-fan cycle time of less than 120 seconds suggests that the compressor 140 is running at a maximum operating speed of 64 Hz. If it is determined at step 612 that the condenser-fan cycle time is less than 120 seconds, the process 600 proceeds to step 618.

At step 618, the operating speed of the compressor 140 is adjusted from 64 Hz to the minimum speed for the compressor 140 (e.g. approximately 22 Hz) and the compressor 140 is instructed to run for a desired runtime. Altering the operating speed from 64 Hz to 22 Hz increases the condenser-fan cycle time to reduce the number of trips of the pressure switch 147, which in turn reduces the number of cycles of the condenser fan 143. The desired runtime is used to ensure that the HVAC system 100 does not alter the operating speed of the compressor 140 before an amount of time equal to the desired runtime has passed. The desired runtime may be selected based on various design considerations. For example, the operator may want the compressor 140 to operate at the 22 Hz operating speed for 1 hour. After the 1-hour period, the process 600 can be restarted to determine if any conditions, such as, for example, the ambient temperature, have changed. In other embodiments, the desired runtime may be a multiple of the condenser-fan cycle time. For example, the desired runtime may be equal to ten times the condenser-fan cycle time. In other embodiments, the desired runtime may be equal to a total condenser-fan cycle time. The total condenser-fan cycle time is equal to a sum of each condenser-fan cycle time that is measured. However, if it is determined at step 616 that the condenser-fan cycle time is greater than the second threshold condenser-fan cycle time, the process 600 proceeds to step 620.

At step 620, the average condenser-fan cycle time is, by default, between the first and second threshold condenser-fan cycle times of 300 seconds and 120 seconds, respectively. FIG. 3A shows that a condenser-fan cycle time between 120 seconds and 300 seconds suggests a compressor speed of 38 Hz. At step 622, no adjustment to the operating speed of the compressor 140 is made. Instead, the operating speed of the compressor 140 remains set to the 38 Hz operating speed and the controller 150 directs the compressor 140 to remain at the 38 Hz operating speed for a time equal to the desired runtime. Similar to step 612, the desired runtime may be selected based on various design preferences. After step 618, the process 600 returns to step 602.

The process 600 described above may be modified to satisfy various design parameters. For example steps may be removed, added, or changed. For example, and not by way of limitation, in some embodiments multiple condenser-fan cycle times may be measured and an average condenser-fan cycle time may be calculated. The number of condenser-fan cycles to be measured may be selected to satisfy various design parameters. For example, measuring a low number of condenser-fan cycles permits the process 600 to more quickly react to system conditions. Measuring a higher number of condenser-fan cycles provides more data to calculate a more accurate average condenser-fan cycle time.

In some embodiments, step 606 may further include using the controller 150 to instruct the compressor 140 to operate at a suggested starting operating speed based upon the measured ambient temperature. For example, the suggested starting operating speed may be selected from an established table, such as, for example, Table 1. As shown in Table 1, suggested starting operating speeds are shown for 3 ambient temperature values for exemplary 3 ton, 5 ton, and 6 ton HVAC systems. It should be understood that additional suggested starting operating speeds for additional ambient temperatures and additional HVAC systems could be determined and used in connection with the process 600. In some embodiments, when a suggested starting operating speed has not been previously determined for a specific measured ambient temperature, interpolation may be used to calculate the suggested starting operating speed for the measured ambient temperature based upon other previously determined ambient temperatures and suggested starting operating speeds. The compressor 140 may be run at the suggested starting operating speed for a desired runtime. The process 600 then continues to step 608 when either the desired runtime has expired or the pressure switch 147 has tripped.

In some embodiments, the controller 150 may continuously or periodically monitor the temperature sensor 145. If the controller 150 determines that the ambient temperature has increased above the predetermined threshold temperature, the process 600 may be terminated and a preset logic for non-low-ambient temperatures may be used to control the compressor 140.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

In general, the terms minimum/maximum and low/high are used throughout the application to indicate values relative to an acceptable range of values. For example, the minimum acceptable liquid pressure and the maximum acceptable liquid pressure indicate relative minimums/maximums for the liquid pressure and not absolute minimums/maximums. By further example, an operating speed of the compressor may be described as a low speed or a high speed. A low operating speed indicates a range of speeds near an acceptably low operating speed of the compressor and a high operating speed indicates a range of speeds near an acceptably high operating speed of the compressor. For example, if the acceptable operating speeds of the compressor 140 are between about 22 Hz and about 64 Hz, an exemplary low operating speed would be between about 22 Hz and about 30 Hz and an exemplary high operating speed would be between about 50 Hz and about 64 Hz. However, in other embodiments, these ranges can be varied based upon various design parameters.

In the above description, reference has been made to various 3 ton, 5 ton, and 6 ton HVAC systems. It should be understood that these systems are exemplary systems and are not meant to disclose the behaviors of every 3 ton, 5 ton, and 6 ton HVAC system. For example, minimum and maximum compressor-operating speeds and minimum and maximum acceptable liquid pressures of the 3 ton, 5 ton, and 6 ton HVAC systems discussed herein are not meant to be limiting. Other HVAC systems may have different operational limits for compressor speed and acceptable liquid pressure. For example, other 3 ton HVAC systems may not behave exactly the same as the 3 ton HVAC systems described herein, but it should be understood that the basic concepts and methodologies described above will apply to a wide range of HVAC systems of various tonnages. It should also be understood that the operating speed of a compressor may be varied between the compressor's minimum and maximum operating speed (e.g., the 3 ton HVAC system 100 disclosed herein is not limited to operating at discrete speeds of 22 Hz, 38 Hz, and 64 Hz, but may be operated within the range between 22-64 Hz).

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of controlling a heating, ventilation and air-conditioning (HVAC) system, the method comprising:
   measuring an ambient temperature;
   determining whether the ambient temperature is below a threshold temperature value;
   responsive to a determination that the ambient temperature is below the threshold temperature value, measuring a condenser-fan cycle time of the HVAC system; and
   setting a speed of a compressor based on the measured condenser-fan cycle time.

2. The method of claim 1, wherein the condenser-fan cycle time is an average of at least two measured condenser-fan cycle times.

3. The method of claim 1, further comprising:
   determining whether the condenser-fan cycle time is greater than a first threshold time; and
   wherein, responsive to a determination that the condenser-fan cycle time is greater than the first threshold time, the setting comprises setting the compressor to operate at a demand speed.

4. The method of claim 3, further comprising:
   responsive to a determination that the condenser-fan cycle time is below the first threshold time, determining whether the condenser-fan cycle time is below a second threshold time;
   wherein, responsive to a determination that the condenser-fan cycle time is below the second threshold time, the setting comprises setting the compressor to operate at a low operating speed for a desired runtime; and
   wherein the low operating speed comprises operating the compressor at an operating speed between about 22 Hz and about 30 Hz.

5. The method of claim 4, wherein the desired runtime is a multiple of the measured condenser-fan cycle time.

6. The method of claim 4, wherein, responsive to a determination that the condenser-fan cycle time is below the first threshold time and above the second threshold time, the setting comprises setting the compressor to operate at a speed between a high operating speed and the low operating speed for the desired runtime, wherein the high operating speed comprises operating the compressor at an operating speed between about 50 Hz and about 64 Hz.

7. The method of claim 1, wherein the ambient temperature measuring is performed via a temperature sensor.

8. The method of claim 1, wherein the determining and setting steps are performed by a controller associated with the HVAC system.

9. The method of claim 8, wherein the setting comprises sending a signal from the controller to the compressor.

10. The method of claim 1, wherein a condenser-fan cycle time comprises time elapsed between occurrences of a liquid pressure of a refrigerant reaching a maximum acceptable liquid pressure.

11. The method of claim 10, wherein a pressure sensor is tripped responsive to the liquid pressure of the refrigerant reaching the maximum acceptable liquid pressure.

12. The method of claim 1, wherein a temperature of a refrigerant of the HVAC system is monitored to calculate a pressure of the refrigerant.

13. The method of claim 1, wherein the setting comprises increasing the condenser-fan cycle time to reduce a number of condenser-fan cycles.

14. The method of claim 1, wherein, responsive to the determining, setting the compressor speed to a predetermined suggested starting operating speed for a desired runtime.

15. A heating, ventilation, and air-conditioning (HVAC) system comprising:
    a controller configured to:
        receive an ambient temperature of an area surrounding an outdoor unit of the HVAC system;
        determine whether the ambient temperature is below a threshold temperature value;
        responsive to a determination that the ambient temperature is below the threshold temperature value, measure a condenser-fan cycle time of the HVAC system; and
        set a speed of a compressor based on the measured condenser-fan cycle time.

16. The system of claim 15, wherein the controller is further adapted to:
    determine if the condenser-fan cycle time is greater than a first threshold time; and
    wherein, responsive to a determination that the condenser-fan cycle time is greater than the first threshold time, set the compressor speed to a demand speed.

17. The system of claim 16, wherein the controller is further adapted to:
    responsive to a determination that the condenser-fan cycle time is below the first threshold time, determine if the condenser-fan cycle time is below a second threshold time;
    wherein, responsive to a determination that the condenser-fan cycle time is below the second threshold time, set the compressor speed to a low operating speed for a desired runtime; and
    wherein the low operating speed comprises operating the compressor at an operating speed between about 22 Hz and about 30 Hz.

18. The system of claim 17, wherein the controller is further adapted to:
    responsive to a determination that the condenser-fan cycle time is below the first threshold time and above the second threshold time, set the compressor speed to a speed that is between a high operating speed and the low operating speed for the desired runtime, wherein the high operating speed comprises operating the compressor at an operating speed between about 50 Hz and about 64 Hz.

19. The system of claim 15, wherein the controller is adapted to measure more than one condenser-fan cycle time and to determine an average condenser-fan cycle time.

20. The system of claim 15, further comprising an indoor unit, the indoor unit comprising the controller.

21. The system of claim 20, wherein the outdoor unit is in fluid and electronic communication with the indoor unit, the outdoor unit comprising:
    the compressor, wherein the compressor is fluidly coupled to an evaporator coil of the indoor unit;
    a condenser coil fluidly coupled to the compressor to receive a compressed refrigerant from the compressor;
    a condenser fan disposed in proximity to the condenser coil and adapted to direct ambient air around the condenser coil;
    a pressure sensor disposed downstream from the compressor and adapted to measure a liquid pressure of the compressed refrigerant; and
    an ambient air temperature sensor for measuring an ambient temperature of an area surrounding the outdoor unit.

22. A method of controlling a heating, ventilation and air-conditioning (HVAC) system, comprising:
    measuring an ambient temperature;
    determining whether the ambient temperature is below a threshold temperature value;
    responsive to a determination that the ambient temperature is below the threshold temperature value, measuring a condenser-fan cycle time of a compressor;
    determining if the condenser-fan cycle time is greater than a first threshold time;
    responsive to a determination that the condenser-fan cycle time is greater than the first threshold time, setting the compressor to operate at a demand speed;
    responsive to a determination that the condenser-fan cycle time is less than the first threshold time, determining if the condenser-fan cycle time is below a second threshold time; and
    responsive to a determination that the condenser-fan cycle time is below the second threshold time, setting the compressor to operate at a low operating speed for a desired runtime; and
    wherein the low operating speed comprises operating the compressor at an operating speed between about 22 Hz and about 30 Hz.

* * * * *